US010849369B2

(12) United States Patent
Malhotra et al.

(10) Patent No.: US 10,849,369 B2
(45) Date of Patent: Dec. 1, 2020

(54) APPAREL WITH WIRELESS-POWERED SENSORS

(71) Applicant: NIKE, INC., Beaverton, OR (US)

(72) Inventors: Vikram Malhotra, Portland, OR (US); Holli Pheil, Portland, OR (US); Summer L. Schneider, Beaverton, OR (US)

(73) Assignee: NIKE, Inc., Beaverton, OR (US)

( * ) Notice: Subject to any disclaimer, the term of this patent is extended or adjusted under 35 U.S.C. 154(b) by 65 days.

(21) Appl. No.: 15/575,847

(22) PCT Filed: May 27, 2016

(86) PCT No.: PCT/US2016/034685
§ 371 (c)(1),
(2) Date: Nov. 21, 2017

(87) PCT Pub. No.: WO2016/196304
PCT Pub. Date: Dec. 8, 2016

(65) Prior Publication Data
US 2018/0125122 A1 May 10, 2018

Related U.S. Application Data

(60) Provisional application No. 62/168,058, filed on May 29, 2015.

(51) Int. Cl.
*A41D 1/00* (2018.01)
*H02J 50/10* (2016.01)
(Continued)

(52) U.S. Cl.
CPC .............. *A41D 1/005* (2013.01); *A41D 1/002* (2013.01); *A41D 27/205* (2013.01); *H02J 50/10* (2016.02); *H02J 50/40* (2016.02); *H02J 50/80* (2016.02)

(58) Field of Classification Search
CPC . H02J 50/10; H02J 50/80; H02J 50/40; A41D 1/002; A41D 1/005; A41D 27/205
See application file for complete search history.

(56) References Cited

U.S. PATENT DOCUMENTS

| 8,701,578 B2 | 4/2014 | Chung et al. | |
| 2008/0056508 A1* | 3/2008 | Pierce | H04R 5/02 381/87 |

(Continued)

FOREIGN PATENT DOCUMENTS

| WO | WO-2014138204 A1 | 9/2014 | |
| WO | WO 2015/019261 A1 * | 2/2015 | ............. G08B 25/01 |

(Continued)

OTHER PUBLICATIONS

"European Application Serial No. 16804127.5, Response filed Aug. 9, 2018 to Communication Pursuant to Rules 161(1) and 162 EPC dated Jan. 30, 2018", 18 pgs.

(Continued)

*Primary Examiner* — Jared Fureman
*Assistant Examiner* — Duc M Pham
(74) *Attorney, Agent, or Firm* — Schwegman Lundberg & Woessner, P.A.

(57) ABSTRACT

An article of apparel, system, and methods optionally include a textile material, a mobile device holder, coupled to the textile material, configured to secure a mobile device with respect to the article of apparel, and an electrical system. The electrical system includes an antenna, configured to communicatively couple with a primary antenna of the mobile device, positioned in relation to the holder, a power supply, coupled to the antenna, configured to output power based on a current as generated in the antenna when communicatively coupled with the primary antenna, a controller, coupled to the power supply, operable based on the power as output by the power supply, and a sensor, coupled (Continued)

to the textile material, communicatively coupled to the controller via a conductor, configured to detect a sensor condition and output a sensor signal when powered by the power output by the power supply.

32 Claims, 6 Drawing Sheets

(51) Int. Cl.
*A41D 27/20* (2006.01)
*H02J 50/40* (2016.01)
*H02J 50/80* (2016.01)

(56) References Cited

U.S. PATENT DOCUMENTS

| | | | |
|---|---|---|---|
| 2010/0089897 A1* | 4/2010 | Bart | A41D 13/0051 219/211 |
| 2011/0299715 A1 | 12/2011 | Kaiser | |
| 2013/0057392 A1* | 3/2013 | Bullock | G06K 7/10029 340/10.5 |
| 2014/0070957 A1* | 3/2014 | Longinotti-Buitoni | A61B 5/6804 340/870.01 |
| 2016/0000374 A1* | 1/2016 | Dandekar | A61B 5/0002 600/301 |
| 2017/0196513 A1* | 7/2017 | Longinotti-Buitoni | A61B 5/6804 |

FOREIGN PATENT DOCUMENTS

| | | |
|---|---|---|
| WO | WO-2015019261 A1 | 2/2015 |
| WO | WO-2016196304 A1 | 12/2016 |

OTHER PUBLICATIONS

"International Application Serial No. PCT/US2016/034685, International Search Report dated Sep. 7, 2016", 3 pgs.

"International Application Serial No. PCT/US2016/034685, Written Opinion dated Sep. 7, 2016", 10 pgs.

"European Application Serial No. 16804127.5, Extended European Search Report dated Mar. 22, 2019", 7 pgs.

"European Application Serial No. 16804127.5, Response filed Sep. 25, 2019 to Extended European Search Report dated Mar. 22, 2019", I left the receipt in because of the date discrepency (response drafted on Sep. 18, 2019 but not filed until Sep. 25, 2019), 15 pgs.

"European Application Serial No. 16804127.5, Communication Pursuant to Article 94(3) EPC dated May 6, 2020", 4 pgs.

"European Application Serial No. 16804127.5, Response filed Aug. 28, 2020 to Communication Pursuant to Article 94(3) EPC dated May 6, 2020", 12 pgs.

\* cited by examiner

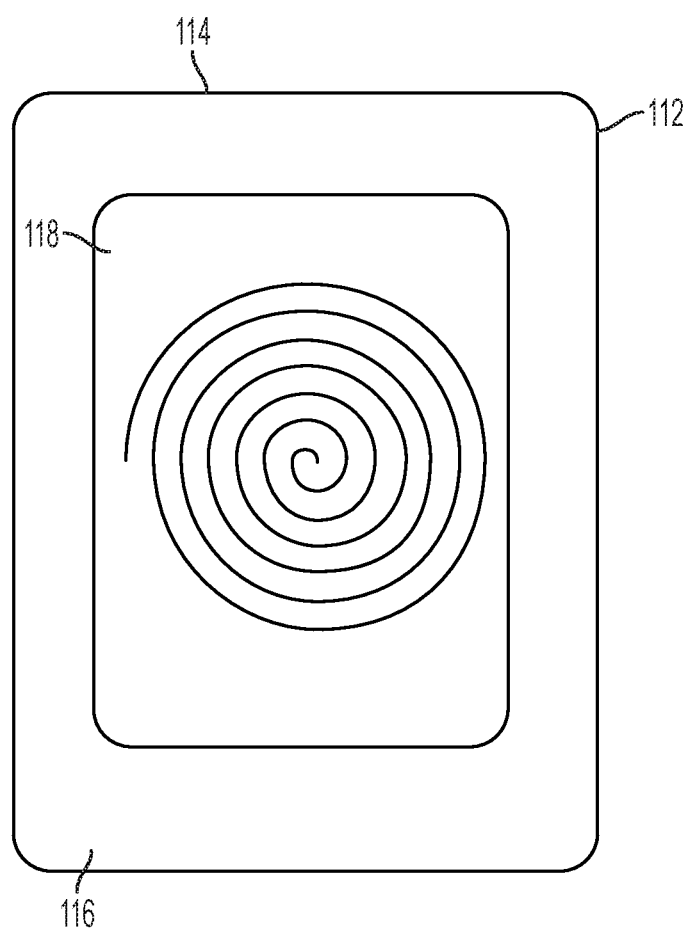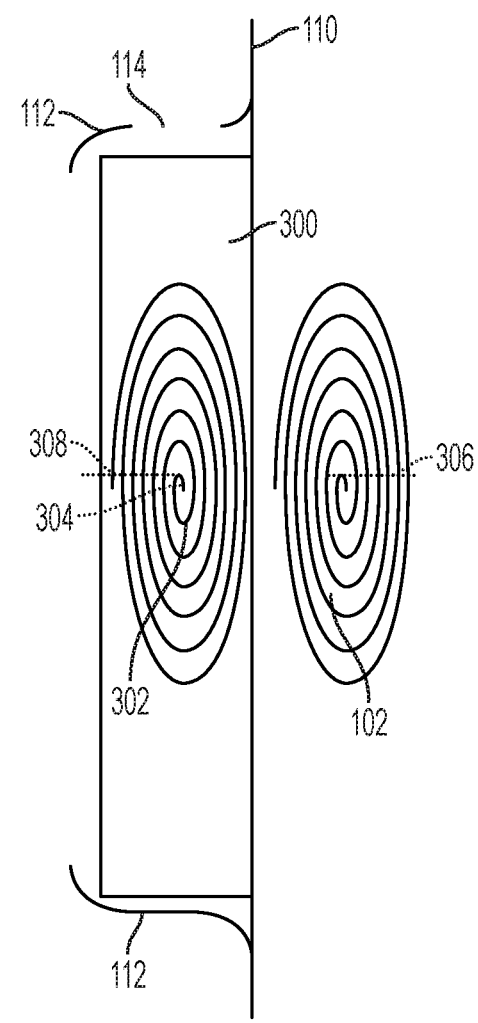
FIG. 2
FIG. 3

APPAREL WITH WIRELESS-POWERED SENSORS

PRIORITY CLAIM

This application is a U.S. National Stage Filing under 35 U.S.C. 371 from International Patent Application Serial No. PCT/US2016/034685, published on Dec. 8, 2016 as WO2016/196304, which application claims the benefit of priority of U.S. Provisional Patent Application Ser. No. 62/168,058, filed on May 29, 2015, which are incorporated by reference herein in their entireties.

TECHNICAL FIELD

The subject matter disclosed herein generally relates to an article of apparel including sensors that are powered by a wireless signal.

BACKGROUND

Articles of apparel, such as shirts, pants, hats, shoes, and the like, are conventionally and advantageously some or all of comfortable, washable, and robust. As a result, such articles of apparel have conventionally been made substantially of fabrics and other textiles. Articles of apparel often include pockets or other mechanisms to secure objects to or with respect to the article of apparel, typically fashioned out of the same or similar fabrics as those used in the rest of the article of apparel.

BRIEF DESCRIPTION OF THE DRAWINGS

Some embodiments are illustrated by way of example and not limitation in the figures of the accompanying drawings.

FIG. 2 is a detailed depiction of a mobile device holder in relation to an antenna, in an example embodiment.

FIG. 3 is an abstract, side profile depiction of a mobile device as secured by a holder, in an example embodiment.

DETAILED DESCRIPTION

Example methods and systems are directed to apparel with wireless-powered sensors. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

As a result of a general need to be washable, comfortable, and robust, articles of apparel have in the past only infrequently incorporated electronics elements. In particular, electronics are well-known to be susceptible to water, such as from the elements, washing, or human sweat. As such, articles of apparel that do incorporate electronics may require measures, such as conventional waterproofing, to protect the components against moisture.

However, such measures may suffer from a certain vulnerability in particular: electronics often require a physical electronic interface for one or more of a source of power and an ability to transmit and/or receive data, among other inputs or outputs from the electronics. Conventionally, such interfaces are wired which may inevitably present a vulnerability through which moisture may enter the system. Steps that may be taken to protect such physical interfaces from moisture may result in the article of apparel being relatively less robust, owing to the potential for the mechanical breakdown of the moisture protection, and less comfortable, owing to the bulkiness or rigidity of such protection.

An article of apparel has been developed that provides for the wireless transmission of power and data to operate sensors and other electronics positioned in or on the article of apparel. The article of apparel includes a pocket or other securing mechanism to position and retain a mobile device, such as a smartphone or similar piece of electronics, in relation to an antenna, such as a near field communication (NFC) antenna. The antenna may establish a wireless link between the mobile device and the antenna, providing power to the sensors and receiving data from the sensors.

As such, the article of apparel does not necessarily utilize an internal power source as power may be provided by the mobile device. The electronics in the article of apparel may be fully waterproofed with no direct contact electromechanical interface. As a result, the article of apparel may be readily washable and substantially impervious to the elements during normal use while still generating and providing sensor data.

Figure 1:
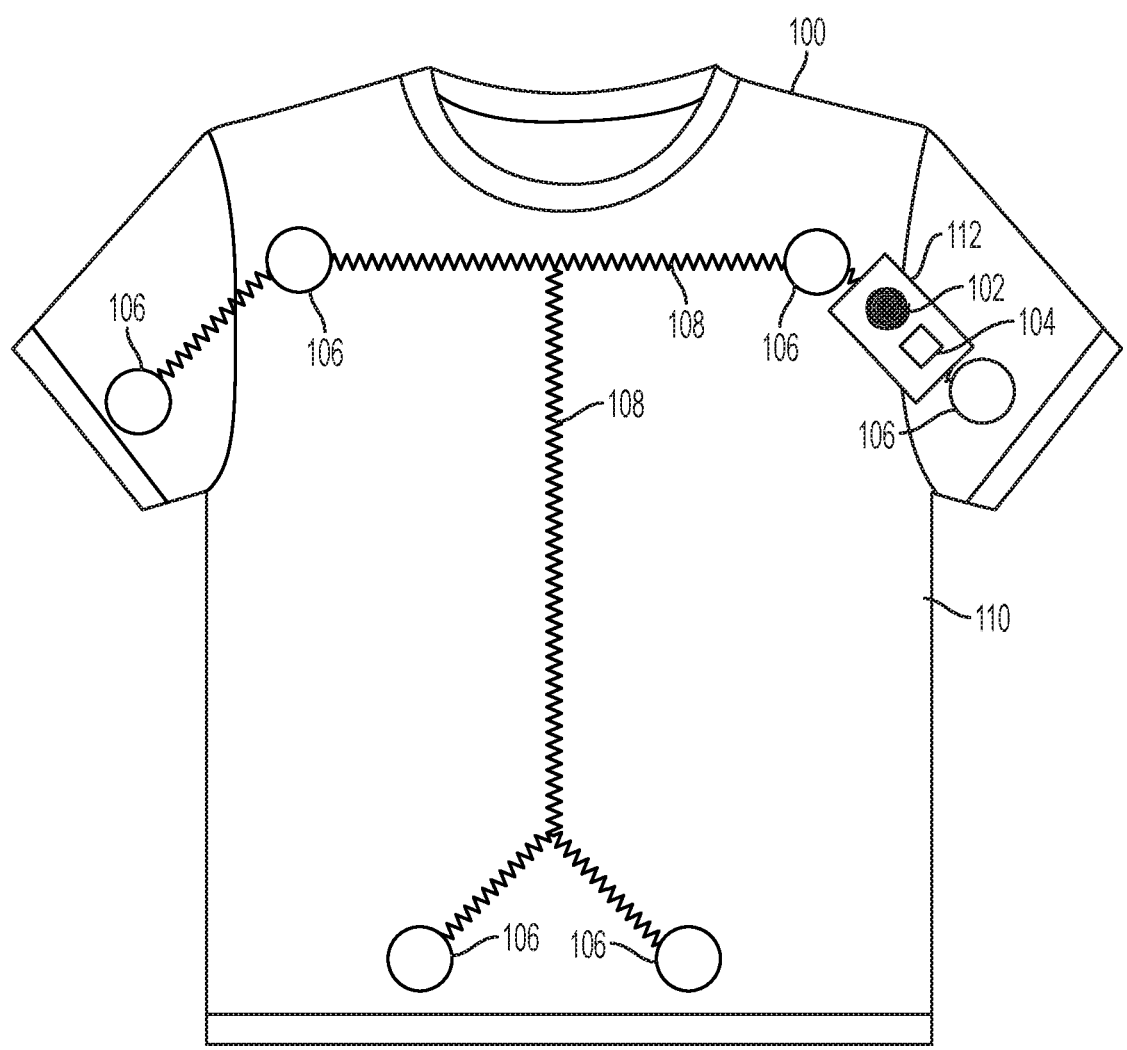
FIG. 1 is an article of apparel, in an example embodiment.

FIG. 1 is an article of apparel 100, in an example embodiment. As illustrated, the article of apparel 100 is a shirt but various examples may include any garment or other article that may be worn on or otherwise secured to a body of a person or other animal.

The article of apparel 100 includes an antenna 102 configured for wireless communication with a primary antenna. The wireless communication may be according to near field communication (NFC) standards and practices, including in the 13.56 megahertz (MHz) ban according to the ISO/IEC 18000-3 standard promulgated in 2010 or according to any other suitable wireless communication standard that has been or may be developed.

The antenna may be coupled to or be a part of an NFC tag 104. The NFC tag 104 may include an electronic data storage, controller, transceiver, power source, and various other electronics needed or suitable for NFC communications. The tag 104 is passively powered and derives its operational energy from the wireless signal received from the antenna 102. In various examples, the tag 104 may be or may be replaced with any suitable electronics that are configured to receive power from a mobile device and transmit data to an external receiver.

The tag 104 is coupled to sensors 106 via conductors 108. The sensors 106 are positioned in various locations on the article of apparel 100 and may be configured to sense various conditions. Various numbers and positions of sensors 106 are contemplated as appropriate for the conditions sensed by the sensors. In various examples, the sensors 106 include one or more of motion sensors, moisture sensors, heat sensors, heart rate sensors, near infrared spectroscopy (NIRS) sensors, and other suitable sensors that are known in the art or that may be developed. Each sensor 106 detects a sensor condition dependent on a respective sensor type;

thus, the sensor condition of a motion sensor is motion, and so forth. Each sensor 106 outputs a sensor signal indication of the sensor condition as sensed.

In various examples, the conductors 108 are secured with respect to a material 110 that forms a substantial majority of the overall structure of the article of apparel 100. The material 110, such as a textile material, may include multiple and varied individual pieces of fabric or other materials stitched or otherwise secured with respect to one another to form the basic architecture of the article of apparel 100. As such, the material 110 is not necessarily a unitary component but rather may incorporate any and all materials that may be utilized in apparel generally, including textiles, leather, rubber, synthetic fabrics, and the like, and may be secured with respect to one another according to any of a variety of securing mechanisms, including stitching, glue, welding, and fasteners in general.

The conductors 108 may be secured with respect to the material 110 according to any of a variety of mechanisms. In examples where the material is a woven material, such as a fabric or textile in general, the conductors 108 may be incorporated into a weave of the material 110. In an example, the conductors 108 may be woven into the material 110 at the time of the manufacture of the material 110. Additionally or alternatively, the conductors 108 may be included in or along a seam of the material 110. Additionally or alternatively, the conductors 108 may be molded or otherwise secured within a synthetic material, such as a plastic or polymer, at the time of manufacture of the material 110. Additionally or alternatively, the conductors 108 may be attached or otherwise secured to a surface of the material 110 with fasteners, such as with thread, glue, and/or other suitable fasteners.

As illustrated, the conductors 108 are secured with respect to the material 110 so as to allow the conductors 108 to stretch, bend, flex, and otherwise conform to and retain resiliency during similar movements of the underling material 110. The conductors 108 of the illustrated example are secured in a "W" or saw tooth configuration to allow for stretching and bending along a long axis of the conductor 108. Any additional configuration that promotes or at least allows for stretching, bending, flexing, and the like may be implemented in addition or alternative to the illustrated configuration. Additionally or alternatively, the conductor 108 itself may stretch and readily flex, in which case the conductor 108 may, in a relaxed state, trace relatively straight lines between points on the material 110.

The antenna 102, tag 104, sensors 106, and conductor 108 may function as a self-contained electrical system (FIG. 4) that is waterproof and otherwise mechanically isolated from environmental conditions. Thus, in various examples, the electrical system does not incorporate exposed or intentionally exposable electrical contacts or other connection points. The components of the electrical system in general may be coated with suitable materials that may provide for waterproofing and for environmental isolation in general.

The article of apparel 100 further includes a mobile device holder 112 configured to seat and secure a mobile device having a primary antenna configured to communicate with the antenna 102. The mobile device may be a conventional mobile device known in the art, such as a smartphone, a personal digital assistant (PDA), media player, or any consumer or custom device that includes a primary antenna (FIG. 3) and a power source configured to supply power to the primary antenna.

FIG. 2 is a detailed depiction of the mobile device holder 112 in relation to the antenna 102, in an example embodiment. The holder 112 is attached to or otherwise part of the material 110 so that the primary antenna of the mobile device is positioned with respect to the antenna 102 to facilitate wireless communication between the primary antenna and the antenna 102. As illustrated, the holder 112 is directly over the antenna 102. Various additional examples may have the holder 112 offset with respect to the antenna 102 in such a way as to still allow for wireless communication. Further, additional antennas 102 of the same type as the antenna 102 may be incorporated into the article of apparel 100 and positioned to further facilitate wireless communication as appropriate. Thus, for instance, a first antenna 102 may be positioned as illustrated while a second antenna 102 may be positioned offset with respect to the holder 112.

Further, various antennas 102 of differing types may be incorporated to allow for or otherwise facilitate communication and power transfer in a variety of different wireless bands and according to a variety of wireless communication modalities. Thus, one or more additional antennas may be incorporated that is configured to communicate in ultra-high frequency (UHF) bands, e.g., at approximately 900 MHz, among other bands. The additional antennas may be substantially co-located with the antenna 102, either closely adjacent to or partially overlapping the antenna 102, or may be positioned anywhere on the article of apparel 102 as appropriate.

The holder 112 of the illustrated example forms a pocket into which a mobile device may be inserted through a top opening 114 and retained by a friction fit of a pocket material 116. The pocket material 116 may be the same as the material 110 or may be a second material different than the material 110. In an example, the pocket material 116 is an elastic material configured to conform to and secure the mobile device. In various examples, if the material 110 is sufficiently elastic to retain the mobile device securely then the material 110 may be utilized as the pocket material 116. However, if the material 110 is insufficiently elastic then an alternative elastic material may be utilized as the pocket material 116 instead.

The holder 112 further includes an interface opening 118 configured to allow a user of the mobile device, such as a wearer of the article of apparel 100, to interface with the mobile device. For instance, in examples where the mobile device is a smartphone with a touchscreen interface, the user may interact with the user interface of the mobile device through the interface opening 118 of the holder 112. The interface opening 118 may be entirely empty or devoid of any interface material or may incorporate a covering material that may nevertheless permit interaction with a touchscreen user interface of the mobile device, as known in the art.

Various alternative examples of the holder 112 include, as an alternative to or in addition to the pocket as illustrated, brackets, cinches, straps, or any mechanical device that that may secure, attach, or otherwise retain the mobile device with respect to the antenna 102 and to the article of apparel 100 generally. Furthermore, while the holder 112 is depicted as being positioned on the sleeve of the article of apparel 100, it is to be recognized and understood that the antenna 102 and the holder 112 may be repositioned to any of a variety of positions on the article of apparel 100, in which case the construction of the holder 112 may or may not advantageously change or otherwise be configured to reflect the location of the holder 112. Thus, for instance if the holder 112 were positioned on the shoulder of the article of apparel 100 the holder 112 may be or may incorporate straps that secure the mobile device with a friction fit rather than or in addition to the pocket as illustrated. Further, additional structure may be added as necessary or desired to secure the mobile device and provide a comfortable wearing experience for a wearer of the article of apparel 100.

As illustrated, the antenna 102 is a coil antenna configured to communicate according to an NFC modality. It is noted and emphasized that the antenna 102 may be an etched antenna configured to communicate according to NFC or may be any other antenna configuration configured to communicate according to any other wireless communication modality. The antenna 102 has a major surface 200 that is parallel to a major surface of the material 110. The holder 112 is configured to bring the primary antenna of the mobile device into substantial alignment with the antenna 102 by placing a major surface of the primary antenna substantially parallel with the major surface 200 of the antenna 102.

FIG. 3 is an abstract, side profile depiction of a mobile device 300 as secured by the holder 112, in an example embodiment. The mobile device 300 includes a primary antenna 302 and a transceiver that is configured to communicate over the same frequency band and according to the same communication modality as the antenna 102. In circumstances where the mobile device 300 has more than one antenna, such as where the mobile device 300 is a smartphone configured to communicative via cellular modalities, Bluetooth, and the like, the article of apparel 100 may incorporate multiple antennas configured to communicate according to those additional modalities and/or the antenna 102 and tag 104 may be configured to communicate over one or more of those bands and according to one or more of those modalities as well as according to the band and modality as disclosed herein, e.g., NFC.

As illustrated, the mobile device 300 is secured within the holder 112 so as to place the primary antenna 302 in substantial alignment with the antenna 102. Alignment may be assessed in any dimension, including absolute proximity. Substantial alignment does not require maximized proximity between the primary antenna 302 and the antenna 102. In an example, the antennas 102, 302 may be considered to be in substantial alignment if a center 304 of the primary antenna 302 is within one centimeter of the antenna 102. Additionally or alternatively, the antennas 102, 302 may be considered in alignment if the antennas 102, 302 are able to communicate with one another. Thus, in various examples, the holder 112 is configured to provide alignment that is more substantial than mere basic connectivity and communication. However, it is to be understood that various examples of the holder 112 in relation to the antenna 102 may not necessarily provide for better than basic alignment of the antennas 102, 302.

Additionally or alternatively, the antenna 102 and the primary antenna 302 each have a major axis 306, 308 projecting from their respective centers 304. The antenna 102 and the primary antenna 302 may be considered to be in substantial alignment when the axes 306, 308 are substantially coaxial. In an example, the axes 306, 308 are substantially coaxial when the axes 306, 308 are within approximately one (1) centimeter of one another.

Figure 4:
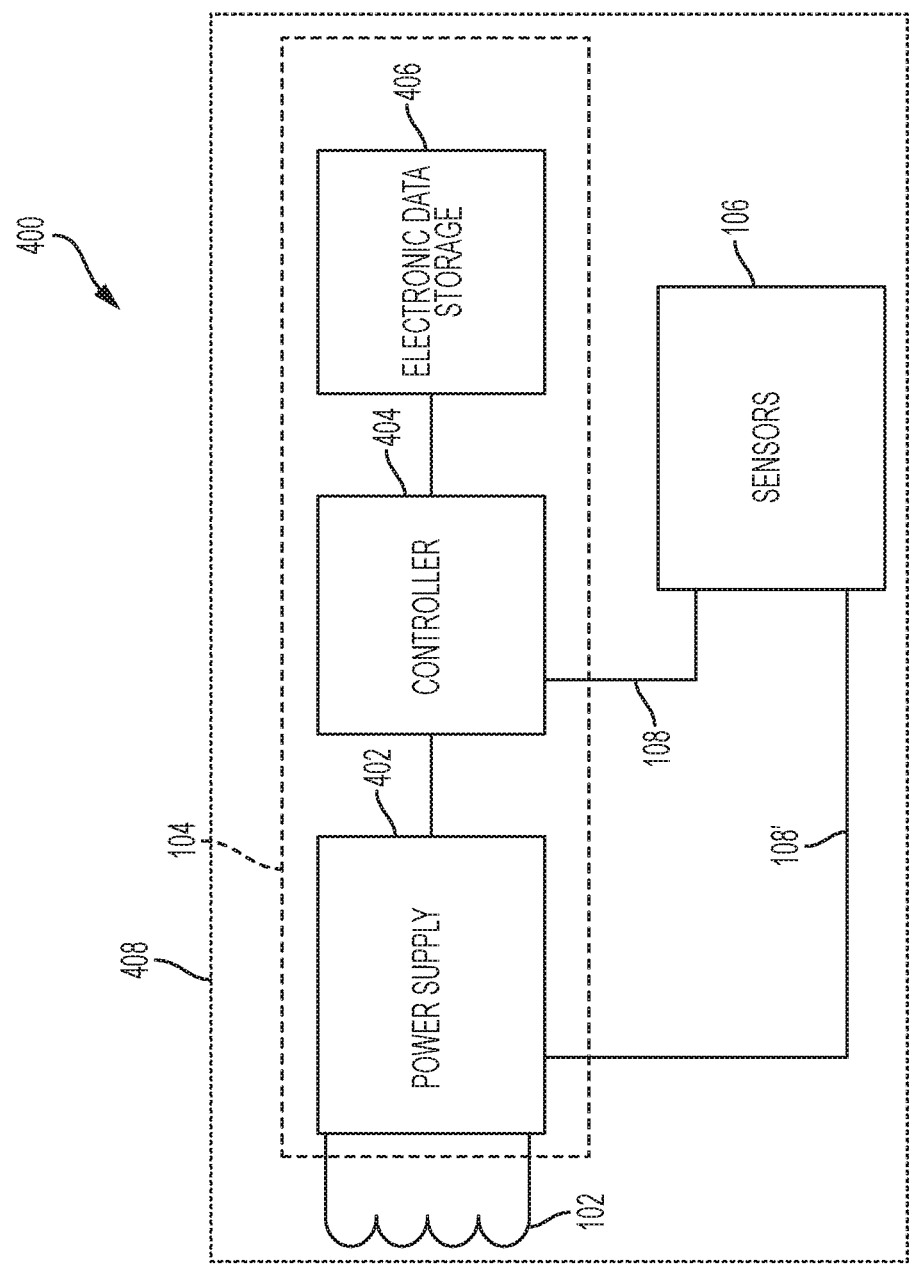
FIG. 4 is a block diagram of an electrical system of an article of apparel, in an example embodiment.

FIG. 4 is a block diagram of the electrical system 400 of the article of apparel 100, in an example embodiment. The electrical system 400 includes the antenna 102 and various blocks included in the tag 104, including, but not limited to, a power supply 402, a controller 404, and an electronic data storage 406. The power supply 402 and the controller 404 are coupled via the conductor 108 to the sensor 106. Additionally or alternatively, the antenna 102 may further be a component of the tag 104, forming an integrated RFID tag.

As illustrated, the example electrical system 400 includes no long-term power source, such as a battery, super capacitor, and the like. Rather, the electrical system 400 is a passive system and components of the electrical system 400 operate when a current is induced in the antenna 102 by the mobile device 300 and the primary antenna 302. The power supply 402 rectifies and coverts the current to a voltage suitable for operation of the various components of the electrical system 400. As such, in the illustrated example, not only the components of the tag 104 but also the sensors 106 operate when the mobile device 300 has established a wireless link with the antenna 102, and in various examples only when the mobile device 300 has established a wireless link with the antenna 102.

In various examples, power storage elements, such as batteries, super capacitors, and the like may be included in the electrical system 400 to provide a long term source of power for the electrical system 400. In such an example, the electrical system 400 may still function according to the various other principles disclosed herein and may optionally still obtain system power from the current induced in the antenna 102. In such examples, the current induced in the antenna 102 may recharge such a power source or supplement the power provided by the power source. However, it is emphasized that examples are explicitly contemplated in which no long term power storage is included in the electrical system 400.

The electrical system 400 is isolated from environmental conditions by an environmental barrier 408. The environmental barrier 408 may be made from or may include an encapsulant, such as a silicone rubber or other similar material, that may be molded, brushed, or otherwise applied to the various components of the electrical system 400. Additionally or alternatively, the environmental barrier may be or may include a casing or other structure in which some or all of the components of the electrical system 400 may be enclosed.

As illustrated, the environmental barrier 408 thus fully or substantially isolates the electrical system 400 from water and/or other environmental contaminants, such as elements that are or may be corrosive to electronics. Even if the environmental barrier 408 may unintentionally degrade over time owing to normal use and washing of the article of apparel 100, the environmental barrier 408 as initially constituted includes no intentional ingress or egress points for environmental elements. The sensors 106 may constitute an exception where measuring an environmental condition is integral to the operation of the sensor, such as a moisture sensor. However, such sensors 106 may nevertheless incorporate their own environmental isolation that would, without unintended deterioration, isolate the rest of the electrical system 400 from environmental conditions.

The sensors 106 are coupled via the conductor 108 to the controller 404. Data that is generated by the sensors 106 may, when the controller is powered, be manipulated and stored in the electronic data storage 406 and/or transmitted via the antenna 102 to the mobile device 300 or other device that may be within range of the antenna 102. The controller 404 may transmit the sensor data by modulating the current induced in the antenna 102 according to conventional communication modalities that are compatible with the antenna 102 and mobile device 300. While not illustrated, the electrical system 100 may incorporate a dedicated transceiver block configured to modulate the current in the antenna 102 to transmit data and to detect modulations in the current induced by the mobile device 300 to transmit data to the electrical system 400. The modulation as detected may be sent as data to the controller 404.

The sensors 106 are further illustrated as being coupled to the power source 402 directly via a second conductor 108'. The second conductor 108' may optionally be implemented for active sensors 106 that utilize external power to generate sensor data. The sensor data may then be transmitted to the controller 404 via the conductor 108. The second conductor 108' may be co-located with and routed alongside the conductor 108, as illustrated herein. Sensors 106 that are not active sensors may not incorporate the second conductor 108'. While the second conductor 108' is illustrated with particularity, it is to be recognized and understood that any number of conductors may be implemented as appropriate and necessary to operate the various sensors 106.

Figure 5:
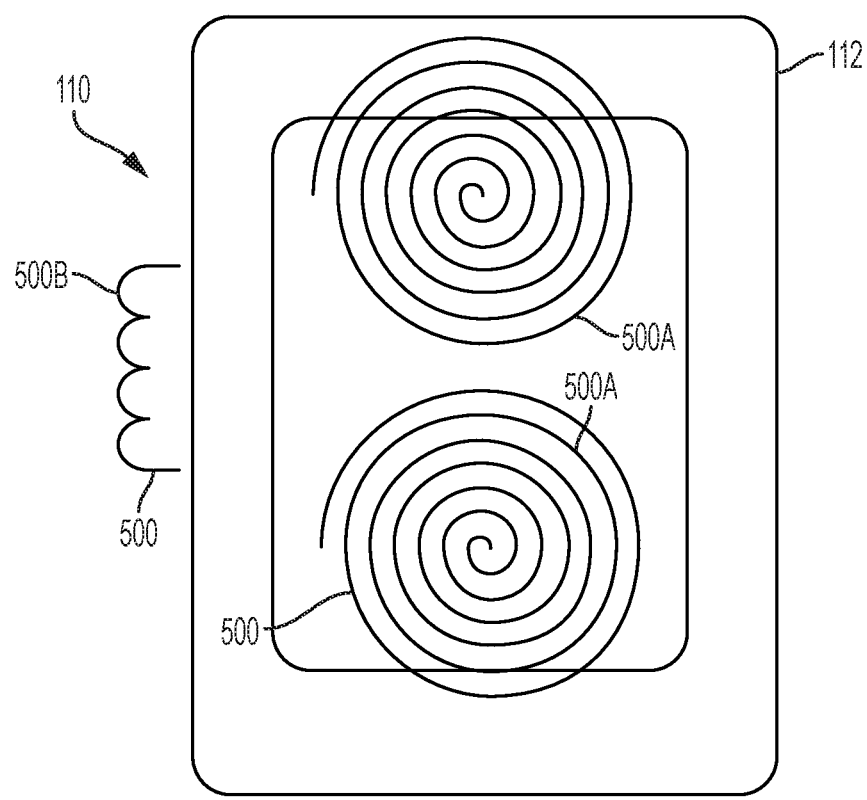
FIG. 5 is an example of a holder in relation to multiple antennas, in an example embodiment.

FIG. 5 is an example of the holder 112 in relation to multiple antennas 500, in an example embodiment. The antennas 500 may be or may include the antenna 102. The antennas 500 are secured to the material 110 with respect to the holder 112 to facilitate communication between at least one of the antennas 500 and the primary antenna 302 of the mobile device 300. The antennas 500 include antennas of varying types configured to communicate according to varying wireless communication modalities, as disclosed herein.

In an example, coil antennas 500A are substantially overlapped by the holder 112, which is configured to bring the coil antennas 500A into close alignment with the primary antenna 302 of the mobile device 300. The coil antenna 500A may be configured to communicate according to a first communication modality, such as an NFC modality. The use of multiple coil antennas 500A may increase a likelihood of the primary antenna 302 being in substantial alignment with at least one antenna 500A irrespective of the position of the primary antenna 302 in the mobile device 300. Thus, the holder 112 and the article of apparel 100 in general may be configured to seat and interface with multiple makes and models of mobile devices 300.

The antennas 500 further include a dipole antenna 500B. The dipole antenna 500B is simplified as illustrated and it is to be understood that the dipole antenna 500B may be any antenna configured to communicate according to a second communication modality different than the first communication modality, such as any of a variety of wireless communication modalities, including but not limited to UHF, Bluetooth, and other modalities. As illustrated, the dipole antenna 500B is offset with respect to the holder 112 and does not overlap the holder 112 generally. In such an example, the dipole antenna 500B being offset may save space on the material 110 proximate the holder 112 while still maintaining communicative coupling between the dipole antenna 500B and the primary antenna 302. It is noted and emphasized that the dipole antenna 500B in particular, and the antennas 500 generally, are not necessarily offset with respect to the holder 112 and that, if space permits, all of the antennas 500 may overlap the holder 112. However, various antennas 500 may be offset with respect to the holder 112 while still maintaining the capacity to communicatively couple to the primary antenna 302.

Figure 6:
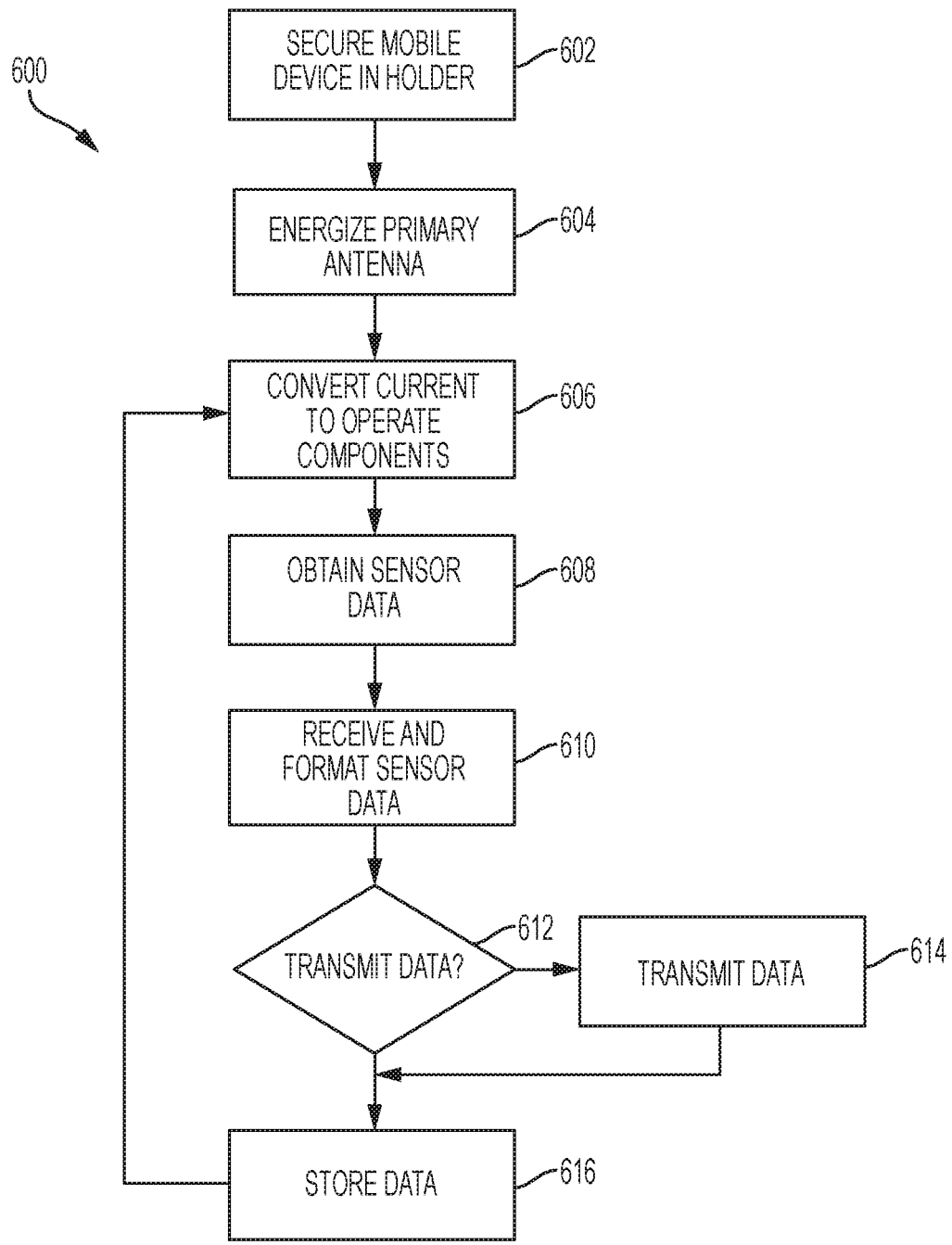
FIG. 6 is a flowchart for using an article of apparel, in an example embodiment

FIG. 6 is a flowchart 600 for using the article of apparel 100, in an example embodiment.

At 602, a mobile device 300 is secured by the holder 112 such that a primary antenna 302 of the mobile device 300 is in alignment with the antenna 102.

At 604, the mobile device 300 energizes the primary antenna 302, inducing a current in the antenna 102 which is passed to the power supply 402. To the extent that the mobile device 300 ceases to induce the current in the antenna 102, the remaining operations of the flowchart 600 terminate effectively immediately for lack of operating power.

At 606, the power supply 402 converts the current as received from the antenna 102 into power to operate the controller 404 and the sensors 106 and transmits the power at least to the controller 404 and, in an example, to the sensors 106 as well.

At 608, the sensors 106 obtain sensor data and transmit the sensor data to the controller 404.

At 610, the controller 404 receives the sensor data and formats the sensor data in a form that can be stored in the electronic data storage 406 and/or transmitted to the primary device 300.

At 612, the controller 404 determines if the sensor data, as formatted, should be transmitted to the mobile device 300. The determination may be made based on a command from the primary device 300, a subroutine executed by the controller 404 that causes the controller 404 to transmit the sensor data both received and as stored in the electronic data storage 406, or a subroutine executed by the controller 404 that causes the sensor data to be streamed to the mobile device 300 as the sensor data is received and formatted by the controller 404.

At 614, if the controller 404 causes the sensor data to be transmitted to the primary device 300, transmitter circuitry that may, in various embodiments, be a component of the power supply 402 or the controller 404 modulates the current in the antenna 102 according to the sensor data as formatted which results in a current in the primary coil 302 similarly being modulated in a way that allows for the sensor data to be read in the mobile device 300.

At 616, the controller 404 may store the sensor data as formatted in the electronic data storage 406. In operation 614, the controller 404 may access the sensor data as stored in the electronic data storage 406 and transmit the sensor data as accessed to the primary device 300. The flowchart 600 may then return to operation 606 for as long as the current is induced in the antenna 102, terminating when the current is no longer induced in the antenna 102, either because the mobile device 300 ceases inducing a current in the primary antenna 302 or because the primary antenna 302 is taken out of alignment with the antenna 102, e.g., because the primary device is removed from or otherwise becomes unsecured with respect to the holder 112.

Figure 7:
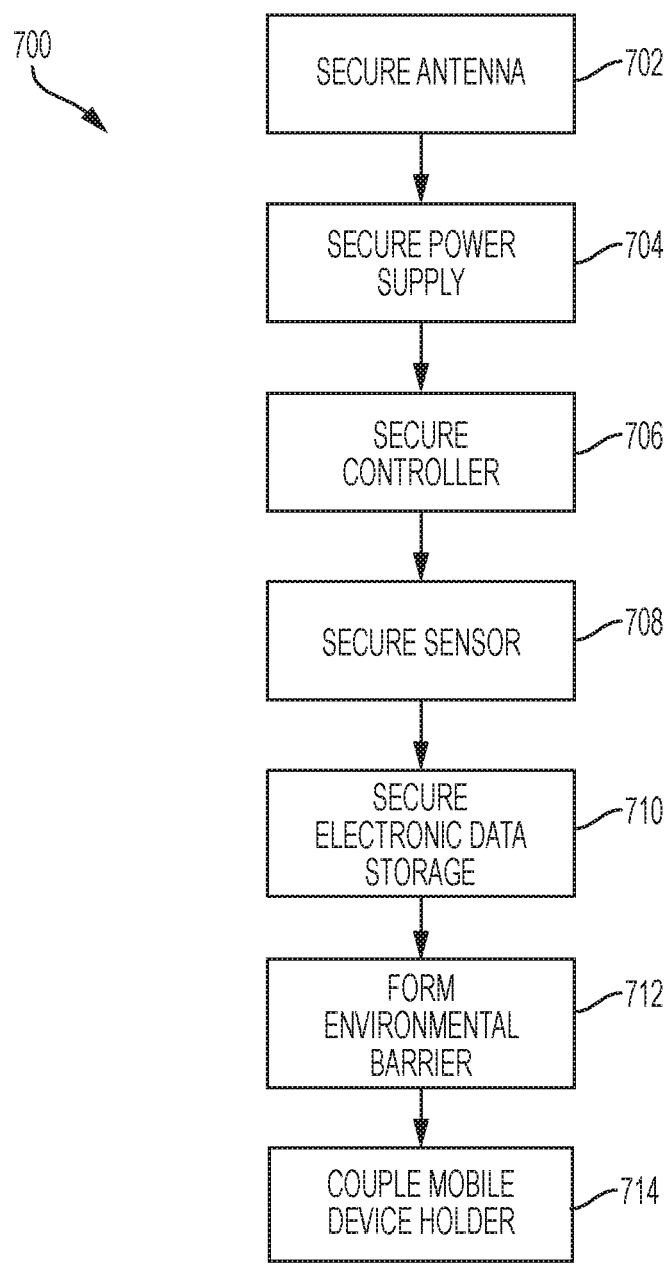
FIG. 7 is a flowchart for making an article of apparel, in an example embodiment

FIG. 7 is a flowchart 700 for making the article of apparel 100, in an example embodiment.

At 702, an antenna configured to communicatively couple with a primary antenna of a mobile device, is secured with respect to textile material of an article of apparel. In an example, securing the antenna is at a location on the textile material that is overlapped, at least in part, by a mobile device holder. In an example, securing the antenna at the location on the textile material is such that, when the mobile device is secured in the mobile device holder, the primary antenna of the mobile device is in alignment with the antenna.

In an example, the antenna has an antenna major surface and the primary antenna has a primary antenna major surface, and wherein securing the antenna and the coupling the holder causes the primary antenna of the mobile device to be in alignment with the antenna when positioned in the holder such that the major surfaces are substantially parallel with respect to one another. In an example, the antenna has a primary axis and the primary antenna has a primary axis, and wherein securing the antenna and the coupling the holder causes the primary antenna to be in alignment with the antenna when the primary axes are substantially coaxial.

In an example, securing the antenna includes securing a plurality of antennas, including the antenna, with respect to the textile material, the plurality of antennas being secured to the textile material with respect to the holder such that the primary antenna is communicatively coupleable with at least one of the plurality of antennas when positioned in the holder. In an example, the plurality of antennas include a first antenna configured to communicate according to a first communication modality and a second antenna configured to communicate according to a second communication modality different than the first communication modality. In an example, securing the plurality of antennas include securing at least one of the plurality of antennas substantially overlapped by the holder and at least one of the plurality of antennas is not substantially overlapped by the holder.

At 704, a power supply, coupled to the antenna, is secured with respect to the textile material, the power supply configured to output power based on a current as generated in the antenna when communicatively coupled with the primary antenna.

At 706, a controller is secured with respect to the textile material, the controller coupled to the power supply and operable based on the power as output by the power supply. In an example, the controller is configured to receive the sensor signal and transmit data indicative of the sensor signal to the mobile device via the antenna.

At 708, a sensor is secured with respect to the textile material, the sensor coupled to the textile material, communicatively coupled to the controller via a conductor and configured to detect a sensor condition and output a sensor signal when powered by the power output by the power supply.

At 710, an electronic data storage of the electrical system is secured with respect to the textile material and wherein the controller is configured to store data indicative of the sensor signal in the electronic data storage. In an example, the controller is configured to store data received from the mobile device via the antenna in the electronic data storage. In an example, the controller is configured to transmit data stored in the electronic data storage to the mobile device via the antenna.

Some or all of 702, 704, 706, 708, and 710 may occur concurrently where the relevant components are components of a single RFID tag 104. In such an example, some or all of 702, 704, 706, 708, and 710 may come from the single step of securing the RFID tag to or with respect to the article of apparel.

At 712, an environmental barrier is formed, configured to isolate an electrical system including the antenna, the power supply, the controller, and the sensor, from an environmental condition. In an example, forming the environmental barrier provides no point of ingress for the environmental condition. In an example, the environmental barrier is an encapsulant and forming the environmental barrier comprises applying the encapsulant to all components of the electrical system. In an example, the environmental barrier is a waterproof barrier.

At 714, the mobile device holder is coupled to or otherwise secured with respect to the textile material of the article of apparel, mobile device holder configured to secure a mobile device with respect to the article of apparel.

EXAMPLES

In Example 1, an article of apparel includes a textile material, a mobile device holder, coupled to the textile material, configured to secure a mobile device with respect to the article of apparel, and an electrical system. The electrical system includes an antenna, configured to communicatively couple with a primary antenna of the mobile device, positioned in relation to the holder, a power supply, coupled to the antenna, configured to output power based on a current as generated in the antenna when communicatively coupled with the primary antenna, a controller, coupled to the power supply, operable based on the power as output by the power supply, and a sensor, coupled to the textile material, communicatively coupled to the controller via a conductor, configured to detect a sensor condition and output a sensor signal when powered by the power output by the power supply.

In Example 2, the article of apparel of Example 1 optionally further includes an environmental barrier configured to isolate the electrical system from an environmental condition.

In Example 3, the article of apparel of any one or more of Examples 1 and 2 optionally further includes that the environmental barrier is configured to provide no point of ingress for the environmental condition.

In Example 4, the article of apparel of any one or more of Examples 1-3 optionally further includes that the environmental barrier is an encapsulant applied to all components of the electrical system.

In Example 5, the article of apparel of any one or more of Examples 1-4 optionally further includes that the environmental barrier is a waterproof barrier.

In Example 6, the article of apparel of any one or more of Examples 1-5 optionally further includes that the antenna is secured at a location on the textile material that is overlapped, at least in part, by the mobile device holder.

In Example 7, the article of apparel of any one or more of Examples 1-6 optionally further includes that the antenna is secured at the location on the textile material such that, when the mobile device is secured in the mobile device holder, the primary antenna of the mobile device is in alignment with the antenna.

In Example 8, the article of apparel of any one or more of Examples 1-7 optionally further includes that the antenna has an antenna major surface and the primary antenna has a primary antenna major surface, and wherein the primary antenna of the mobile device is in alignment with the antenna when the major surfaces are substantially parallel with respect to one another.

In Example 9, the article of apparel of any one or more of Examples 1-8 optionally further includes that the antenna has a primary axis and the primary antenna has a primary axis, and wherein the primary antenna is in alignment with the antenna when the primary axes are substantially coaxial.

In Example 10, the article of apparel of any one or more of Examples 1-9 optionally further includes that the electrical system comprises a plurality of antennas including the antenna, the plurality of antennas being secured to the textile material with respect to the holder such that the primary antenna is communicatively coupleable with at least one of the plurality of antennas.

In Example 11, the article of apparel of any one or more of Examples 1-10 optionally further includes that the plurality of antennas include a first antenna configured to communicate according to a first communication modality and a second antenna configured to communicate according to a second communication modality different than the first communication modality.

In Example 12, the article of apparel of any one or more of Examples 1-11 optionally further includes that the at least one of the plurality of antennas is substantially overlapped by the holder and at least one of the plurality of antennas is not substantially overlapped by the holder.

In Example 13, the article of apparel of any one or more of Examples 1-12 optionally further includes that the controller is configured to receive the sensor signal and transmit data indicative of the sensor signal to the mobile device via the antenna.

In Example 14, the article of apparel of any one or more of Examples 1-13 optionally further includes that the electrical system further includes an electronic data storage and wherein the controller is configured to store data indicative of the sensor signal in the electronic data storage.

In Example 15, the article of apparel of any one or more of Examples 1-14 optionally further includes that the electrical system further includes an electronic data storage and wherein the controller is configured to store data received from the mobile device via the antenna in the electronic data storage.

In Example 16, the article of apparel of any one or more of Examples 1-15 optionally further includes that the electrical system further includes an electronic data storage and wherein the controller is configured to transmit data stored in the electronic data storage to the mobile device via the antenna.

In Example 17, a method of making an article of apparel includes coupling a mobile device holder to a textile material of the article of apparel, mobile device holder configured to secure a mobile device with respect to the article of apparel, securing an antenna, configured to communicatively couple with a primary antenna of the mobile device, in relation to the holder, securing a power supply, coupled to the antenna, with respect to the textile material, the power supply configured to output power based on a current as generated in the antenna when communicatively coupled with the primary antenna, securing a controller with respect to the textile material, the controller coupled to the power supply and operable based on the power as output by the power supply, and securing a sensor with respect to the textile material, the sensor coupled to the textile material, communicatively coupled to the controller via a conductor and configured to detect a sensor condition and output a sensor signal when powered by the power output by the power supply.

In Example 18, the method of Example 17 optionally further includes forming an environmental barrier configured to isolate an electrical system including the antenna, the power supply, the controller, and the sensor, from an environmental condition.

In Example 19, the article of apparel of any one or more of Examples 17 and 18 optionally further includes forming the environmental barrier provides no point of ingress for the environmental condition.

In Example 20, the article of apparel of any one or more of Examples 17-19 optionally further includes that the environmental barrier is an encapsulant and forming the environmental barrier comprises applying the encapsulant to all components of the electrical system.

In Example 21, the article of apparel of any one or more of Examples 17-20 optionally further includes that the environmental barrier is a waterproof barrier.

In Example 22, the article of apparel of any one or more of Examples 17-21 optionally further includes securing the antenna is at a location on the textile material that is overlapped, at least in part, by the mobile device holder.

In Example 23, the article of apparel of any one or more of Examples 17-22 optionally further includes securing the antenna at the location on the textile material is such that, when the mobile device is secured in the mobile device holder, the primary antenna of the mobile device is in alignment with the antenna.

In Example 24, the article of apparel of any one or more of Examples 17-23 optionally further includes that the antenna has an antenna major surface and the primary antenna has a primary antenna major surface, and wherein securing the antenna and the coupling the holder causes the primary antenna of the mobile device to be in alignment with the antenna when positioned in the holder such that the major surfaces are substantially parallel with respect to one another.

In Example 25, the article of apparel of any one or more of Examples 17-24 optionally further includes that the antenna has a primary axis and the primary antenna has a primary axis, and wherein securing the antenna and the coupling the holder causes the primary antenna to be in alignment with the antenna when the primary axes are substantially coaxial.

In Example 26, the article of apparel of any one or more of Examples 17-25 optionally further includes securing a plurality of antennas, including the antenna, with respect to the textile material, the plurality of antennas being secured to the textile material with respect to the holder such that the primary antenna is communicatively coupleable with at least one of the plurality of antennas when positioned in the holder.

In Example 27, the article of apparel of any one or more of Examples 17-26 optionally further includes that the plurality of antennas include a first antenna configured to communicate according to a first communication modality and a second antenna configured to communicate according to a second communication modality different than the first communication modality.

In Example 28, the article of apparel of any one or more of Examples 17-27 optionally further includes securing the plurality of antennas include securing at least one of the plurality of antennas substantially overlapped by the holder and at least one of the plurality of antennas is not substantially overlapped by the holder.

In Example 29, the article of apparel of any one or more of Examples 17-28 optionally further includes that the controller is configured to receive the sensor signal and transmit data indicative of the sensor signal to the mobile device via the antenna.

In Example 30, the article of apparel of any one or more of Examples 17-29 optionally further includes securing an electronic data storage of the electrical system with respect to the textile material and wherein the controller is configured to store data indicative of the sensor signal in the electronic data storage.

In Example 31, the article of apparel of any one or more of Examples 17-30 optionally further includes securing an electronic data storage of the electrical system with respect to the textile material and wherein the controller is configured to store data received from the mobile device via the antenna in the electronic data storage.

In Example 32, the article of apparel of any one or more of Examples 17-31 optionally further includes securing an electronic data storage of the electrical system with respect to the textile material and wherein the controller is configured to transmit data stored in the electronic data storage to the mobile device via the antenna.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating." "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

What is claimed is:

1. An article of apparel, comprising:
a textile material;
a mobile device holder, coupled to the textile material, configured to secure a mobile device with respect to the article of apparel; and
an electrical system, including:
an antenna, configured to communicatively couple with a primary antenna of the mobile device, wherein the antenna is positioned so as to be in communicative alignment with the primary antenna of the mobile device;
a power supply, coupled to the antenna, configured to output power based on a current as generated in the antenna when communicatively coupled with the primary antenna;
a controller, coupled to the power supply, operable based on the power as output by the power supply; and
a sensor, coupled to the textile material, communicatively coupled to the controller via a conductor, configured to detect a sensor condition and output a sensor signal when powered by the power output by the power supply.

2. The article of apparel of claim 1, further comprising an environmental barrier configured to isolate the electrical system from an environmental condition.

3. The article of apparel of claim 2, wherein the environmental barrier is configured to provide no point of ingress for the environmental condition.

4. The article of apparel of claim 2, wherein the environmental barrier is an encapsulant applied to all components of the electrical system.

5. The article of apparel of claim 4, wherein the environmental barrier is a waterproof barrier.

6. The article of apparel of claim 1, wherein the antenna is secured at a location on the textile material that is overlapped, at least in part, by the mobile device holder.

7. The article of apparel of claim 6, wherein the antenna is secured at the location on the textile material such that, when the mobile device is secured in the mobile device holder, the primary antenna of the mobile device is in alignment with the antenna.

8. The article of apparel of claim 7, wherein the antenna has an antenna major surface and the primary antenna has a primary antenna major surface, and wherein the primary antenna of the mobile device is in alignment with the antenna when the major surfaces are substantially parallel with respect to one another.

9. The article of apparel of claim 8, wherein the antenna has a primary axis and the primary antenna, has a primary axis, and wherein the primary antenna is in alignment with the antenna when the primary axes are substantially coaxial.

10. The article of apparel of claim 6, wherein the electrical system comprises a plurality of antennas including the antenna, the plurality of antennas being secured to the textile material with respect to the holder such that the primary antenna is communicatively coupleable with at least one of the plurality of antennas.

11. The article of apparel of claim 10, wherein the plurality of antennas include a first antenna configured to communicate according to a first communication modality and a second antenna configured to communicate according to a second communication modality different than the first communication modality.

12. The article of apparel of claim 10, wherein the at least one of the plurality of antennas is substantially overlapped by the holder and at least one of the plurality of antennas is not substantially overlapped by the holder.

13. The article of apparel of claim 1, wherein the controller is configured to receive the sensor signal and transmit data indicative of the sensor signal to the mobile device via the antenna.

14. The article of apparel of claim 1, wherein the electrical system further includes an electronic data storage and wherein the controller is configured to store data indicative of the sensor signal in the electronic data storage.

15. The article of apparel of claim 1, wherein the electrical system further includes an electronic data storage and wherein the controller is configured to store data received from the mobile device via the antenna in the electronic data storage.

16. The article of apparel of claim 1, wherein the electrical system further includes an electronic data storage and wherein the controller is configured to transmit data stored in the electronic data storage to the mobile device via the antenna.

17. A method of making an article of apparel, comprising:
coupling a mobile device holder to a textile material of the article of apparel, mobile device holder configured to secure a mobile device with respect to the article of apparel; and
securing an antenna, configured to communicatively couple with a primary antenna of the mobile device, wherein the antenna is positioned so as to be in communicative alignment with the primary antenna of the mobile device;
securing a power supply, coupled to the antenna, with respect to the textile material, the power supply configured to output power based on a current as generated in the antenna when communicatively coupled with the primary antenna;
securing a controller with respect to the textile material, the controller coupled to the power supply and operable based on the power as output by the power supply; and
securing a sensor with respect to the textile material, the sensor coupled to the textile material, communicatively coupled to the controller via a conductor and configured to detect a sensor condition and output a sensor signal when powered by the power output by the power supply.

18. The method of claim 17, further comprising forming an environmental barrier configured to isolate an electrical system including the antenna, the power supply, the controller, and the sensor, from an environmental condition.

19. The method of claim 18, wherein forming the environmental barrier provides no point of ingress for the environmental condition.

20. The method of claim 18, wherein the environmental barrier is an encapsulant and forming the environmental barrier comprises applying the encapsulant to all components of the electrical system.

21. The method of claim 20, wherein the environmental barrier is a waterproof barrier.

22. The method of claim 17, wherein securing the antenna is at a location on the textile material that is overlapped, at least in part, by the mobile device holder.

23. The method of claim 22, wherein securing the antenna at the location on the textile material is such that, when the mobile device is secured in the mobile device holder, the primary antenna of the mobile device is in alignment with the antenna.

24. The method of claim 23, wherein the antenna has an antenna major surface and the primary antenna has a primary antenna major surface, and
wherein securing the antenna and the coupling the holder causes the primary antenna of the mobile device to be in alignment with the antenna when positioned in the holder such that the major surfaces are substantially parallel with respect to one another.

25. The method of claim 24, wherein the antenna has a primary axis and the primary antenna has a primary axis, and wherein securing the antenna and the coupling the holder causes the primary antenna to be in alignment with the antenna when the primary axes are substantially coaxial.

26. The method of claim 22, further comprising securing a plurality of antennas, including the antenna, with respect to the textile material, the plurality of antennas being secured to the textile material with respect to the holder such that the primary antenna is communicatively coupleable with at least one of the plurality of antennas when positioned in the holder.

27. The method of claim 26, wherein the plurality of antennas include a first antenna configured to communicate according to a first communication modality and a second antenna configured to communicate according to a second communication modality different than the first communication modality.

28. The method of claim 26, wherein securing the plurality of antennas include securing at least one of the plurality of antennas substantially overlapped by the holder and at least one of the plurality of antennas is not substantially overlapped by the holder.

29. The method of claim 17, wherein the controller is configured to receive the sensor signal and transmit data indicative of the sensor signal to the mobile device via the antenna.

30. The method of claim 17, further comprising securing an electronic data, storage of the electrical system with respect to the textile material and wherein the controller is configured to store data indicative of the sensor signal in the electronic data storage.

31. Tire method of claim 17, further comprising securing an electronic data storage of the electrical system with respect to the textile material and wherein the controller is configured to store data received from the mobile device via the antenna in the electronic data storage.

32. The method of claim 17, further comprising securing an electronic data storage of the electrical system with respect to the textile material and wherein the controller is configured to transmit data stored in the electronic data storage to the mobile device via the antenna.

* * * * *